United States Patent [19]

Moeller

[11] Patent Number: 5,085,881
[45] Date of Patent: Feb. 4, 1992

[54] PROCESS FOR FRACTIONATING DRIED MILK PRODUCTS

[75] Inventor: Hans G. Moeller, Uelzen, Fed. Rep. of Germany

[73] Assignee: Kali-Chemie AG, Hannover, Fed. Rep. of Germany

[21] Appl. No.: 630,180

[22] Filed: Dec. 19, 1990

[30] Foreign Application Priority Data

Dec. 20, 1989 [DE] Fed. Rep. of Germany ....... 3942028

[51] Int. Cl.$^5$ ................................................. A23C 1/14
[52] U.S. Cl. ..................................... 426/491; 426/580; 426/588
[58] Field of Search ................ 426/580, 583, 588, 491

[56] References Cited

U.S. PATENT DOCUMENTS

| | | | |
|---|---|---|---|
| 2,129,222 | 9/1938 | Leviton | 99/19 |
| 2,622,982 | 12/1952 | Stevens | 99/19 |
| 2,665,989 | 2/1949 | Howard et al. | 426/491 |
| 4,066,791 | 1/1978 | Corbin, Jr. | 426/588 |
| 4,202,909 | 5/1980 | Pederson | 426/239 |
| 4,692,233 | 9/1987 | Irvine et al. | 426/588 |

FOREIGN PATENT DOCUMENTS

| | | |
|---|---|---|
| 226035 | 6/1987 | European Pat. Off. |
| 282200 | 9/1988 | European Pat. Off. |
| 2245290 | 4/1975 | France . |
| 89/05586 | 6/1989 | PCT Int'l Appl. |
| 1009338 | 11/1965 | United Kingdom . |
| 1478707 | 7/1977 | United Kingdom . |

OTHER PUBLICATIONS

Food, Science and Technology Abstracts No. 78-1-2-C0498.
Food, Science and Technology Abstracts No. 87-0-6-T0030.
Food, Science and Technology Abstracts No. 87-0-1-P0131.

*Primary Examiner*—Donald E. Czaja
*Assistant Examiner*—Helen Pratt
*Attorney, Agent, or Firm*—Foley & Lardner

[57] ABSTRACT

A process for separating fractions from preferably dried milk and/or milk products for use as foodstuffs, foodstuff additives or pharmaceutical adjuvants using an extraction agent which contains from 40 to 100 wt-% carboxylic acids and/or carboxylic acid derivatives and 0 to 60 wt.-% water.

11 Claims, No Drawings

PROCESS FOR FRACTIONATING DRIED MILK PRODUCTS

BACKGROUND OF THE INVENTION

This invention relates to a process for fractionating milk and/or milk products, particularly permeate from the ultrafiltration of whey or the mother liquor from lactose crystallization.

In addition to its main constituent, water, milk contains fat, protein, lactose, mineral substances and a nitrogen-containing, non-protein-containing fraction, the so-called "NPN fraction". The NPN fraction (NPN means non-proteinaceous nitrogen) essentially consists of amino acids, urea, creatinine and ammonia.

Part of the milk supply is processed in dairies into milk for drinking, if necessary after purification, skimming, pasteurization or sterilization. The remaining portion of the milk is processed further to separate certain fractions. Some processes permit selective separation of individual fractions. Other processes aim at completely separating out the substances contained therein.

One modern method of fractionating milk or milk products is ultrafiltration. Ultrafiltration yields a retentate enriched in proteins and a permeate which contains enriched amounts of salts, lactose, the NPN fraction and riboflavin. Ultrafiltration can therefore be used for enriching the salts, lactose, the NPN fraction and riboflavin from milk or milk products. The permeate solution can, for instances, be dried to yield salt-containing and lactose-containing permeats powder. On the other hand, lactose can be obtained from the permeate solution by fractional crystallization.

The desalting of skimmed milk or milk products such as whey, or permeate solution from ultrafiltration is likewise a known process for fractionating milk or milk products. The desalting can for instance take place by passing the aforementioned aqueous substrate over an ion exchanger. Another possibility is electrodialytic treatment of the substrates. The purpose of this desalting is to produce dietetic milk or dietatic milk products. Furthermore, desalting offers certain process-related advantages. For instance, it is known that lactose crystallizes better from desalted aqueous solution. Another example is the separation of whey proteins from whey, which is known to be possible substantially quantitatively from desalted whey by means of acid/heat precipitation. It has also been established that desalted substrate solutions have a higher throughput rate in ultrafiltration.

The known processes for fractionating milk or milk products are therefore carried out in aqueous solution. However, milk and milk products in this form are readily perishable and therefore must be processed promptly. Therefore, when carrying out the known fractionation processes, one is tied to the location where the milk products are produced, that is to say, the dairy. Furthermore, there is seasonal dependency. Although milk or milk products could be dried and then redissolved in water for fractionation by known processes, this is laborious and involves high water and energy consumption.

SUMMARY OF THE INVENTION

It is the object of the invention to devise an improved process for fractionation of milk or milk products.

Another object of the invention is to provide a process for processing milk which can fractionate dried milk or milk products.

These and other objects of the invention are achieved by providing a process for fractionating milk or milk products comprising the steps of (a) extracting dried milk or dried milk products with an extraction agent which contains from 40 to 100 wt-% carboxylic acids and/or carboxylic acid derivatives and 0 to 60 wt.-% water to obtain a liquid extract; and (b) separating solid residues from said liquid extract.

DETAILED DESCRIPTION OF PREFERRED EMBODIMENTS

The process according to the invention for fractionating milk or milk products is characterized in that the starting point is dried milk or dried milk products, these are extracted with an extraction agent which contains carboxylic acids and/or carboxylic acid derivatives in a quantity of approximately 40 to 100% by weight, and water in a quantity of 0 to about 60% by weight, the liquid extract is separated from the solid residue, and the resulting extract and the residue are dried and/or processed further if desired.

Within the scope of the present invention, "dry" is understood to mean milk or milk products with a water content of 0 to 15% by weight. The statement of the water content does not include water bound as water of crystallization. Preferably dry milk or milk product having a water content of 0 to 8% by weight is used.

In principle, one or more desired carboxylic acids, substituted carboxylic acids or one or more carboxylic acid derivatives, mixtures thereof or mixtures of such compounds with up to 60 wt.-% water can be utilized as extraction agents. Naturally, it is necessary that the extraction agent exist in liquid form in the temperature range in which the process according to the invention typically is carried out.

Carboxylic acids are especially suitable. Advantageously, one or more aliphatic carboxylic acids having 1 to 10 carbons atoms or mixtures thereof with water are used. Carboxylic acids with 2 to 6 carbon atoms, especially acetic acid and propionic acid, are particularly suitable.

One or more substituted carboxylic acids or mixtures thereof with up to 60 wt.-% water can also be used. For example, aliphatic carboxylic acids with 1 to 10 carbon atoms which are substituted by one or more halogen atoms, particularly chlorine, with one or more hydroxy groups or oxo groups can be used. Glycolic acid is highly suitable. Also suitable, for example, are chloroacetic acid, dichloroacetic acid or aqueous solutions thereof or an aqueous solution of trichloroacetic acid or ketoglutaric acid. Furthermore, carboxylic acids which contain a further carboxylic acid group, i.e. dicarboxylic acids, are also usable.

Suitable extraction agents may also consist of one or more carboxylic acid derivatives or their mixtures with up to 60 wt.-% water. Advantageously, carboxylic acids are selected which do not react in an undesired manner with water or other milk constituents. For this reason, acid chlorides, fluorides or bromides are not used.

Useful derivatives include, for example, esters of the above-mentioned carboxylic acids or of the above-mentioned substituted carboxylic acids and mixtures thereof with up to 60 wt.-% water. Alkyl esters are especially suitable, particularly lower alkyl esters of carboxylic acids with 2 to 6 carbon atoms. As used herein, the term "alkyl" refers to saturated linear or branched groups containing 1 to 10 carbon atoms, and the term "lower alkyl" refers to such groups containing 1 to 3 carbon atoms. Examples of especially suitable esters include methyl acetate, ethyl acetate, methyl propionate and ethyl propionate.

Individual compounds or, if desired, mixtures of the aforementioned substances can be used as extraction agents.

As used herein, the term "carboxylic acids and/or carboxylic acid derivatives" means that extraction agents can be used within the scope of the present invention which contain one or more carboxylic acids and/or one or more carboxylic acid derivatives.

Advantageously, acids or acid derivatives which are harmless in terms of health are used in the process according to the invention.

Furthermore, it is advantageous to use those acids or acid derivatives which are liquid in the temperature range in which the process according to the invention is carried out.

With certain substrates, it may be advantageous to operate in the upper portion of the stated water content range. The water content is then for instance between about 20 and 60% by weight water. It has been found that when separating lactose from accompanying substances according to the invention, for example from permeate powder from ultrafiltration or from the mother liquor from lactose crystallization, the lactose occurred in a purer form the higher the water content. At the same time, however, the yield decreased. Usually the process according to the invention is therefore carried out at a water content in the lower portion of the stated water content range, for instance between 0 and about 30% by weight.

In a preferred embodiment, the starting point is dried milk or milk products having a water content of not more than 8% by weight, and extraction agents which contain carboxylic acids and/or carboxylic acid derivatives in a quantity of approximately 40 to 100% by weight, preferably 85 to 100% by weight, and water in a quantity of 0 to 60% by weight, preferably 0 to about 15% by weight, are used.

The milk or milk product may be extracted with the extraction agent either continuously or in batches.

The temperature at which the extraction is carried out may vary within a wide range, for instance between 15° and 100° C. However, the extraction is preferably carried out at a temperature between about 15° and about 50° If a person skilled in the art wishes to obtain natural protein fractions, it is recommended to carry out the extraction at temperatures below about 50° C., as otherwise proteins may be denatured.

The extract and solid residue are separated from each other, for instance by decanting, suction filtration, filtering or centrifuging, microfiltration or ultrafiltration.

In one variant, the process according to the invention is carried out as the sole procedure for fractionating milk powder. Apart from having a reduced water content, the substrate, milk powder, contains all the constituents of milk. The fractions are used directly, optionally after drying by removing the extraction agent.

In another variant, the process according to the invention is carried out in addition to known prior art milk fractionating processes. For instance, the process according to the invention may be carried out following known prior art fractionating processes, such as ultrafiltration of whey, as will be described later. The process according to the invention can also be carried out before known prior art fractionating processes. For instance, milk powder may be initially fractionated using the process according to the invention, and the resulting extract and/or residue can be further fractionated, for example by separating mineral substances from the liquid phase by crystallization or by separating lactose from the solid phase by ultrafiltration. Of course, it is also possible to initially subject milk to fractionation according to the prior art, treat the resulting fractionated milk products according to the process of the invention, and then subject the resulting fractions to further fractionation by prior art techniques. An example of this will be described later relating to further fractional crystallization of a whey powder extract fractionated according to the invention.

It is generally true that fat, mineral substances, the NPN fraction and riboflavin are contained in enriched form in the separated liquid extract, and that other milk constituents such as casein, whey proteins and/or lactose are contained in enriched form in the solid residue. Which substances are contained in the extract will naturally depend on whether the process according to the invention is used for the treatment of milk powder or of already-fractionated milk products, for instance whey powder. Similar considerations apply to the solid residue.

After extraction, the extract and the solid residue may be dried and/or otherwise processed further. The manner in which the further processing is carried out will depend on the substrates and on the intended use of the milk fractions contained therein.

In principle, the liquid extract or solid residue can be dried, that is, freed of extraction agent, and used directly. After drying, the constituents of such different substrates as milk powder, skimmed milk powder, whey powder, permeate powder from ultrafiltration, powder of the mother liquor from lactose crystallization etc., which are contained in the liquid extract or in the solid residue are valuable foodstuffs and animal feeds, or food additives, or can be used in other ways, for instance for pharmaceutical purposes.

The milk fractions contained in the extract or residue can however also be fractionated further.

The process according to the invention is particularly suitable for fractionating permeate powder from ultrafiltration of whey and powder of the mother liquor from lactose crystallization.

The process according to the invention will now be described in greater detail with reference to two preferred fields of use, namely fractionating dried permeate from the ultrafiltration of whey, for instance sweet or acid whey, and fractionating powder produced by drying the mother liquor from lactose crystallization.

A preferred field of use comprises fractionating permeate powder from the ultrafiltration of whey, referred to hereinafter as "permeate powder". Such a permeate powder can be obtained in known manner, for instance by adding rennet to skimmed milk and separating sweet whey or by acidulating milk and separating acid whey, subjecting the sweet or acid whey to ultrafiltration, and drying the permeate, for instance by spray drying. The permeate powder contains small quantities of fat, protein, the NPN fraction, salts and, as the main constituent, lactose.

When applying the fractionation process according to the invention to permeate powder, two fractions are obtained. In the extract fraction the lactose content is greatly depleted, but the contents of the other constituents, such as fat, protein, NPN fraction and the salts, is enriched.

The residue from extraction consists of highly pure, colorless lactose with very small quantities of other constituents. The lactose is present as a freely flowing powder without hygroscopic properties. It is outstandingly suitable for use in the dietetic and foods fields and in fattening animals.

After the extraction agent has been separated, the extract is outstandingly suitable as an additive for dietetic foods.

If desired, the extract containing extraction agent may also be fractionated even further. For instance, the extract may be concentrated. Upon concentration, mineral substances are precipitated, particularly a major part of the potassium chloride contained in the extract. The other constituents accordingly become further enriched in the extract.

This fraction, which has been depleted in mineral substances, particularly potassium chloride, and enriched with respect to the other constituents, such as the NPN fraction, can also be fractionated further. For instance, the extraction agent may be separated, the dried extract taken up in water, and calcium phosphate caused to precipitate by adjusting the pH to a value in the range from 6.6 to 10.5. The other contents in the resulting extract, for instance the NPN fraction, are particularly strongly enriched.

Another preferred field of use of the process according to the invention is in fractionating the mother liquor from lactose crystallization. In order to obtain lactose, the permeate from the ultrafiltration of whey is usually concentrated, causing lactose to be precipitated. As a result of the relatively low proportion of lactose, not more than 60 or 70% by weight depending on the degree of concentration, the powder obtained after drying of the mother liquor from lactose crystallization is hardly suitable as an animal feed.

By applying the process according to the invention to the powder obtained by drying the mother liquor from lactose crystallization, an extraction residue fraction is obtained which is greatly enriched in lactose. After separating the extraction agent, a colorless lactose of at least industrial purity (>80% pure) is obtained which is outstandingly suitable for fattening animals.

The extract contains, inter alia., the NPN fraction and salts. As described above, the extract fraction can, if desired, be fractionated and concentrated still further by depletion of the mineral substance content.

The extract fractions obtainable according to the process of the invention, particularly the milk product extract fractions obtainable according to the process of the invention which are substantially free of extraction agent, are novel and are likewise the subject of the present invention. They can be used as foodstuffs. The extract fractions of permeate powder from the ultrafiltration of whey and of the powder obtained by drying the mother liquor from lactose crystallization obtainable according to the process of the invention, which are preferably free of extraction agent, are particularly advantageous. Extract fractions obtainable according to the process of the invention which contain the NPN fraction are especially preferred.

The extraction agent recovered upon drying can be recycled to the process according to the invention, optionally after purification operations such as distillation or filtration. The process according to the invention can therefore be operated as a closed system and is thus environmentally safe.

The process according to the invention has surprising advantages. The process permits fractionation of milk products independently of the location and season. The process according to the invention is at the same time particularly water-saving and energy-saving since, unlike known fractionation processes, an aqueous solution is not produced.

The process according to the invention additionally has surprising process advantages during the further fractionation of the resulting fractions. For instance membrane processes, particularly ultrafiltration, become more optimal. The lactose obtained according to the process of the invention crystallizes particularly well and in addition is not hygroscopic.

The extract fractions with the high NPN contents are valuable dietetic foods.

The following examples are intended to illustrate the process according to the invention in greater detail without limiting its scope.

EXAMPLE 1

Extraction of Permeate Powder from Ultrafiltration of Sweet Whey with Anhydrous Acetic Acid Six liters of anhydrous acetic acid (glacial acetic acid) were added to 2000 grams of permeate powder having the analysis data given in Table I, column 1 "permeate powder" (the protein content was calculated by multiplying the value obtained during the proteinaceous nitrogen analysis by 6.38) and were stirred for 0.5 hours at 70° C. The liquid phase was then separated from the solid phase by suction. After removal of extraction agent residues, the solid phase (i.e., the extraction residue) consisted of 98.61% pure lactose. The analysis data are listed in Table I, column 2 "extraction residue". A sample was taken from the liquid phase and analyzed after the extraction agent had been separated. The analysis data are listed in Table I, column 3 "extract". For further fractionation of the liquid phase, the extract solution was concentrated to approximately 40% by weight dry substance. 57.5 grams of a solid consisting substantially of lactose, protein and mineral substances, particularly potassium chloride, were precipitated. The analysis data of the resulting crystalline fraction and the mother liquor is listed in Table I, columns 4 and 5. The mother liquor was freed of solvent and contained as its essential constituents lactose, protein, mineral substances and the NPN fraction, which was contained in the high concentration of 5.20% by weight.

TABLE I

| Analysis of Permeate Powder & Fractions Thereof (wt. %) | | | | | |
|---|---|---|---|---|---|
| | Permeate powder | Extraction residue | Extract | Crystals | Mother liquor |
| g DS[1] | 2000 | 1800 | 180 | 57.5 | 100 |
| Fat | 0.10 | 0.06 | 0.21 | 0.07 | 0.29 |
| N[2] | 0.70 | 0.25 | 3.50 | 0.65 | 5.20 |
| N × 6.38 | 4.47 | 1.6 | 22.33 | 4.15 | 33.18 |
| NPN[3] | 0.56 | 0.13 | 3.37 | 0.60 | 5.04 |
| Lactose | 84.81 | 98.61 | 23.59 | 17.28 | 27.37 |
| Lactate | 0.75 | 0.02 | 0.69 | 0.02 | 1.10 |
| Citrate | 2.22 | 1.32 | 0.47 | 0.26 | 0.60 |
| Acetate | 0.00 | 0.30 | 2.45 | 0.36 | 3.71 |
| Ash | 7.78 | 1.88 | 55.12 | 78.60 | 41.03 |
| Na | 0.84 | 0.11 | 6.23 | 7.94 | 5.20 |
| K | 2.51 | 0.24 | 21.27 | 30.91 | 15.48 |
| Ca | 0.31 | 0.35 | 0.09 | 0.11 | 0.08 |
| Mg | 0.10 | 0.11 | 0.01 | 0.01 | 0.01 |

TABLE I-continued

Analysis of Permeate Powder & Fractions Thereof (wt. %)

| | Permeate powder | Extraction residue | Extract | Crystals | Mother liquor |
|---|---|---|---|---|---|
| Cl | 2.02 | 0.27 | 17.93 | 39.87 | 4.77 |
| PO$_4$ | 1.63 | 0.61 | 6.04 | 0.22 | 9.53 |
| SO$_4$ | 0.00 | 0.00 | 1.35 | 0.00 | 2.15 |

[1]DS = dry substance
[2]N = total nitrogen according to Kjeldahl
[3]NPN = non-proteinaceous nitrogen As Table I shows, extraction of permeate powder produces a highly pure lactose. This lactose (lactose monohydrate) occurs in colorless form and has a particle size distribution such that 93.5% of the particles are below 0.2 mm. This lactose can be used directly (after separation of any extraction agent residues which may be present) as an animal feed or in pharmacy, for example as a tabletting aid.

The extract is greatly enriched in fat, protein, non-proteinaceous nitrogen and mineral substances, while the lactose content is relatively low. The further fractionation carried out in Example 1 leads to crystals which consist substantially of potassium chloride, while the mother liquor is distinguished by a particularly high enrichment of the NPN fraction. All these fractions are valuable dietetic foodstuffs.

EXAMPLE 2

Extraction of Permeate Powder from Ultrafiltration of Sweet Whey using Anhydrous Propionic Acid The composition of the permeate powder used in this example corresponded to the product used in Example 1 (for analysis data see Table II).

Propionic acid was used as the extraction agent in this example. Approximately 150 grams of the permeate powder were extracted four times with 250 ml propionic acid each time, so that in total 1 liter of the acid was used. The extraction agent was separated each time by suction filtration. The analysis data for the extract and extraction residue are listed in Table II.

TABLE II

Analysis of Permeate Powder & Fractions Thereof (wt. %)

| | Permeate powder | Extraction residue | Extract |
|---|---|---|---|
| g DS[1] | 150 | | |
| Fat | 0.10 | 0.01 | 0.83 |
| N[2] | 0.70 | 0.30 | 3.79 |
| N × 6.38 | 4.47 | 1.91 | 25.3 |
| NPN[3] | 0.56 | 0.16 | 3.71 |
| Lactose | 84.81 | 91.56 | 38.30 |
| Lactate | 0.75 | 0.04 | 6.27 |
| Citrate | 2.22 | 1.57 | 7.40 |
| Ash | 7.78 | 4.79 | 31.41 |
| Na | 0.84 | 0.14 | 6.30 |
| K | 2.51 | 1.75 | 8.52 |
| Ca | 0.31 | 0.32 | 0.21 |
| Mg | 0.10 | 0.11 | 0.04 |
| Cl | 2.02 | 1.60 | 5.37 |
| PO$_4$ | 1.63 | 0.89 | 7.47 |

[1]DS = dry substance
[2]N = total nitrogen according to Kjeldahl
[3]NPN = non-proteinaceous nitrogen As in Example 1, the extraction residue consists of technically pure lactose, while the extract, which can be used as a dietetic foodstuff, is distinguished by being highly enriched in non-proteinaceous nitrogen.

EXAMPLE 3

Extraction of Permeate Powder with Acetic Acid 3.1 Extraction with anhydrous acetic acid 150 grams of permeate powder (for analysis data see Table III, column "permeate powder") were extracted four times with 250 ml anhydrous acetic acid (glacial acetic acid) each time. After extraction was completed, the extraction residue was dried in a vacuum and analyzed (for analysis data see Table III, column 3.1).

3.2 Extraction with Acetic Acid Containing 20% wt.-% Water

Example 3.2 was carried out in a manner corresponding to Example 3.1, except acetic acid containing 20 wt.-% water was used as the extraction agent. The analysis data for the extraction residues are listed in Table III, column 3.2.

3.3 Extraction with Acetic Acid Containing 50 wt.-% Water

Example 3.3 was carried out in a manner corresponding to Example 3.1, except that acetic acid containing 50 wt.-% water was used. The analysis data for the extraction residues are listed in Table III, column 3.3.

TABLE III

Yields and Product Analyses From Extraction of Permeate Powder with Anhydrous and Aqueous Acetic Acid

| | Extraction residue[1] 3.1 | Extraction residue[1] 3.2 | Extraction residue[1] 3.3 |
|---|---|---|---|
| Fat | 0.06 | 0.09 | 0.03 |
| N[2] | 0.25 | 0.04 | 0.03 |
| N × 6.38 | 1.6 | 0.26 | 0.19 |
| NPN[3] | 0.13 | 0.04 | 0.03 |
| Lactose | 97.98 | 98.3 | 99.25 |
| Lactate | 0.02 | 0.01 | 0.05 |
| Citrate | 1.31 | 0.02 | 0.01 |
| Acetate | 0.3 | 0.03 | 0.04 |
| Ash | 1.87 | 0.4 | 0.12 |
| Na | 0.11 | 0.01 | 0.004 |
| K | 0.24 | 0.01 | 0.008 |
| Ca | 0.35 | 0.09 | 0.005 |
| Mg | 0.11 | 0.001 | 0.001 |
| Cl | 0.27 | 0.04 | 0.04 |
| PO$_4$ | 0.61 | 0.04 | 0.04 |
| % Yield | 85 | 60 | 45 |

[1]Numerical data in % by weight
[2]Total nitrogen according to Kjeldahl
[3]Non-proteinaceous nitrogen The analysis data shows that use of aqueous acetic acid yields especially pure lactose. However, yields decrease with increasing water content. The enrichment in the NPN content of the extract increases as the water content increases.

EXAMPLE 4

Extraction of Powder from the Mother Liquor from Lactose Crystallization 25 grams of spray-dried powder from the mother liquor from lactose crystallization from permeate concentrate (for analysis data see Table IV) were extracted five times with 250 ml portions of anhydrous acetic acid (glacial acetic acid). In each case, after about 20 minutes, the liquid phase was separated from the solid phase by suction filtration. The analysis of the extraction residue is listed in Table IV

TABLE IV

Analysis of Powder from the Mother Liquor from Lactose Crystallization and Extraction Residue Obtained Therefrom

| | Mother liquor powder wt. % | Extraction residue wt. % |
| --- | --- | --- |
| Lactose | 53.8 | 91.9 |
| Chloride | 7.05 | 1.25 |
| Ca | 0.77 | 0.95 |
| $PO_4$ | 2.09 | 0.88 |

Example 4 shows that even the mother liquor from lactose crystallization can also be put to efficient use, namely for producing technically pure lactose, using the process according to the invention.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations falling within the scope of the appended claims and equivalents thereof.

What is claimed is:

1. A process for fractionating dried milk or dried milk products, said process comprising the steps of:
   (a) extracting said dried milk or dried milk products with an extracting amount of a liquid extraction agent which contains from 40 to 100 wt-% carboxylic acids and/or carboxylic acid esters and 0 to 60 wt.-% water to obtain a liquid extract; and
   (b) separating solid residues from said liquid extract.

2. A process according to claim 1, further comprising subjecting said liquid extract to a further processing treatment selected from the group consisting of concentration, further fractionation, and drying.

3. A process according to claim 2, wherein said further processing treatment comprises drying said liquid extract.

4. A process according to claim 1, wherein dried milk or milk products having a water content of from 0 to 8% by weight are used as a starting material for the extracting step (a).

5. A process according to claim 1, wherein said extraction agent has a water content in the range from 0 to 15 wt.-%.

6. A process according to claim 1, wherein said extraction agent contains carboxylic acids.

7. A process according to claim 1, wherein said carboxylic acids in said extraction agent contain from 2 to 6 carbon atoms.

8. A process according to claim 7, wherein said carboxylic acids are selected from the group consisting of acetic acid, propionic acid and glycolic acid.

9. A process according to claim 1, wherein said extracting step (a) is carried out at a temperature in the range from about 15° to about 100° C.

10. A process according to claim 9, wherein said extracting step (a) is carried out at a temperature in the range from about 15° to about 50° C.

11. A method of fractionating a milk product selected from the group consisting of sweet whey powder, acid whey powder, dried permeate from the ultracentrifugation of milk, whey, or the mother liquor from lactose crystallization, said method comprising subjecting said milk product to, the steps of:
   (a) extracting said milk product with an extraction agent which contains from 40 to 100 wt.-% carboxylic acids and/or carboxylic acid esters and 0 to 60 wt.-% water to obtain a liquid extract; and
   (b) separating solid residues from said liquid extract.

* * * * *